US011062726B2

(12) United States Patent
Caskey et al.

(10) Patent No.: US 11,062,726 B2
(45) Date of Patent: *Jul. 13, 2021

(54) REAL-TIME SPEECH ANALYSIS METHOD AND SYSTEM USING SPEECH RECOGNITION AND COMPARISON WITH STANDARD PRONUNCIATION

(71) Applicant: International Business Machines Corporation, Armonk, NY (US)

(72) Inventors: Sasha P. Caskey, New York, NY (US); Jian Ni, Ossining, NY (US); Andrzej Sakrajda, Briarcliff Manor, NY (US); Hui Wan, White Plains, NY (US); Cheng Wu, Bellevue, WA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,335

(22) Filed: Jan. 27, 2020

(65) Prior Publication Data
US 2020/0160880 A1 May 21, 2020

Related U.S. Application Data

(63) Continuation of application No. 13/930,546, filed on Jun. 28, 2013, now Pat. No. 10,586,556.

(51) Int. Cl.
*G10L 15/26* (2006.01)
*G10L 15/00* (2013.01)
(Continued)

(52) U.S. Cl.
CPC .............. *G10L 25/48* (2013.01); *G09B 19/04* (2013.01); *G09B 19/06* (2013.01); *G10L 15/00* (2013.01);
(Continued)

(58) Field of Classification Search
CPC ..... G10L 25/48; G10L 15/1815; G10L 15/22; G10L 15/00; G10L 15/265; G09B 19/06; G09B 19/04
(Continued)

(56) References Cited

U.S. PATENT DOCUMENTS 4,969,194 A 11/1990 Ezawa et al.
5,995,932 A 11/1999 Houde
(Continued)

FOREIGN PATENT DOCUMENTS

CN 101366065 A 2/2009
CN 101661675 A 3/2010
CN 102682768 A 9/2012

OTHER PUBLICATIONS

United States Notice of Allowance dated Oct. 25, 2019 in U.S. Appl. No. 13/930,546.
(Continued)

*Primary Examiner* — Farzad Kazeminezhad
(74) *Attorney, Agent, or Firm* — Anthony R. Curro, Esq.; McGinn I.P. Law Group, PLLC.

(57) ABSTRACT

A method of providing real-time speech analysis to a user includes capturing a speech input, performing a real-time recognition of the speech input including converting the speech input to a text, analyzing the recognized speech input to identify an error in a voice of the user, the analyzing including comparing a voice of a correct text generated by an automated speech generation system with the captured speed input, and processing the text to extract a context dialog prompt.

20 Claims, 4 Drawing Sheets

(51) Int. Cl.
*G10L 15/18* (2013.01)
*G10L 15/22* (2006.01)
*G10L 25/48* (2013.01)
*G09B 19/04* (2006.01)
*G09B 19/06* (2006.01)

(52) U.S. Cl.
CPC .......... *G10L 15/1815* (2013.01); *G10L 15/22* (2013.01); *G10L 15/26* (2013.01)

(58) Field of Classification Search
USPC ........................................................ 704/235
See application file for complete search history.

(56) References Cited

U.S. PATENT DOCUMENTS

| | | |
|---|---|---|
| 6,766,311 B1 | 7/2004 | Wall et al. |
| 7,873,522 B2 | 1/2011 | Du et al. |
| 8,175,882 B2 | 5/2012 | Basson et al. |
| 10,586,556 B2 * | 3/2020 | Caskey .................. G09B 19/06 |
| 2002/0115044 A1 | 8/2002 | Shpiro |
| 2004/0172247 A1 | 9/2004 | Yoon et al. |
| 2005/0033582 A1 | 2/2005 | Gadd et al. |
| 2006/0111902 A1 | 5/2006 | Julia et al. |
| 2006/0122834 A1 | 6/2006 | Bennett |
| 2006/0136225 A1 | 6/2006 | Kuo et al. |
| 2006/0161434 A1 | 7/2006 | Faisman et al. |
| 2007/0225980 A1 | 9/2007 | Sumita |
| 2010/0304342 A1 | 12/2010 | Zilber |

OTHER PUBLICATIONS

United States Office Action dated May 15, 2015 in U.S. Appl. No. 13/930,546.
United States Office Action dated Feb. 2, 2015 in U.S. Appl. No. 13/930,546.
Chinese Office Action dated Dec. 2, 2016.
Accent Master: http://www.accentmaster.com/Individuals/Software.htm D/L on Jun. 27, 2013.
Perfect Pronunciation: http://www.antimoon.com/perfectp/perfectp.htm (D/L on Jun. 27, 2013).
ELT: http://www.eltlearn.com/pronunciationsoftware.html (D/L on Jun. 27, 2013).

* cited by examiner

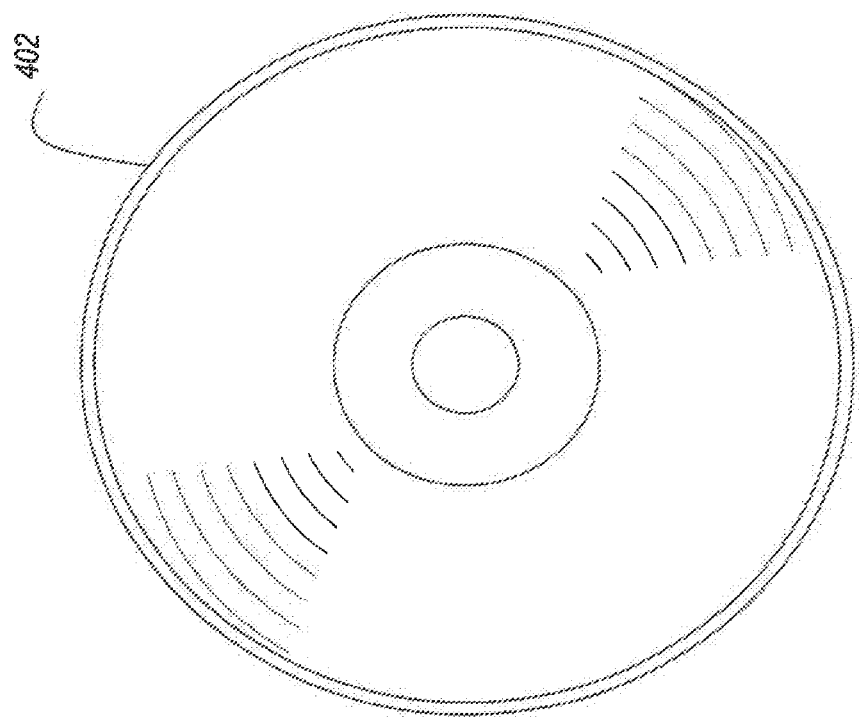
FIG. 4
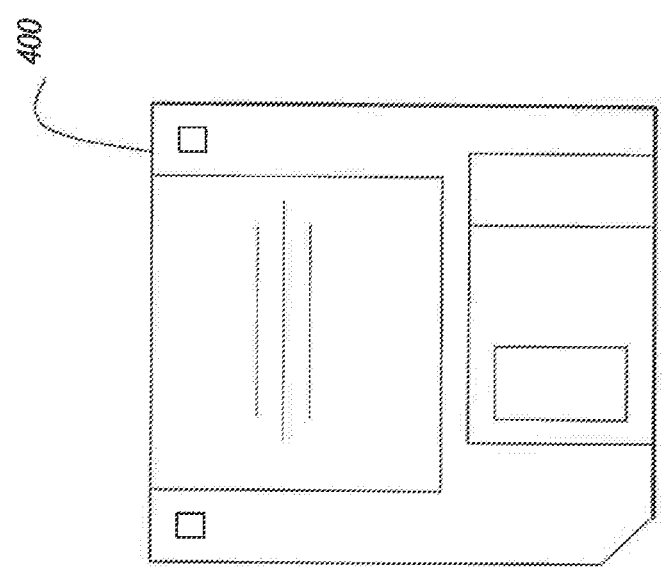

REAL-TIME SPEECH ANALYSIS METHOD AND SYSTEM USING SPEECH RECOGNITION AND COMPARISON WITH STANDARD PRONUNCIATION

The present application is a Continuation application of U.S. patent application Ser. No. 13/930,546, filed on Jun. 28, 2013, the entire content of which is incorporated herein by reference.

BACKGROUND OF THE INVENTION

Field of the Invention

The present invention generally relates to a method and apparatus for analysis of speech, and more particularly to a method and apparatus for real-time speech analysis.

Description of the Related Art

Speech is an integral part of our daily lives. Accurate speech (e.g. pronunciation, grammar, etc.) plays an important role in effective and efficient communication. Being able to speak effectively may allow one to be readily understood, sound confident, and get an important point across clearly.

Conventional devices and techniques of correcting and improving speech include both human instruction as well as computer aided tools.

In a conventional human instruction approach, a human teacher (i.e. speech-language trainer, linguist, etc.) is employed to aid in correction and improvement of speech. For example, one may attend an in-person workshop, or complete an online class.

Use of a live teacher, however, can require large amounts of time. Furthermore, the cost is often very high. Additionally, using such a method lacks much-needed flexibility.

In a conventional computer aided tool, a user opens software and reads a text (pre-selected or randomly selected) shown by the software. The computer analyzes the user's sound track and identifies errors. The computer may analyze the speech, for example, in terms of how close the speech is to a desired pronunciation, or utilize a speech recognition component to convert the speech input to text, and then measure how close the converted text is to the original text.

Such computer aided tools, however, do not provide a personal touch. Further, it is difficult for the computer to represent the user's actual, real-life speech content. Additionally, a user typically still needs to dedicate much time engaging with the tool.

Speech recognition components of conventional tools are pre-trained, and thus highly impersonal. Indeed, conventional computer aided tools cannot dynamically adapt to the content in the user's speech or in the user's conversations with others.

Conventional approaches also require active practicing. Pre-selected text may not correspond to words and phrases most frequently spoken by the user. With conventional techniques, it can be difficult to cover certain things habitually spoken by the user, for example, some technical words.

SUMMARY OF THE INVENTION

In view of the foregoing and other exemplary problems, drawbacks, and disadvantages of the conventional methods and structures, an exemplary feature of the present invention is to provide a method and structure in which a user's speech is corrected and improved in real-time, in a highly personalized, time-efficient manner.

A first exemplary aspect of the present invention includes a method of providing real-time speech analysis for a user. The method including capturing a speech input, performing a real-time recognition of the speech input and analyzing the recognized speech input to identify a possible error in the user's speech.

Another exemplary aspect of the present invention includes a non-transitory computer-readable storage medium tangibility embodying a program of machine-readable instructions executable by a digital processing apparatus to perform a method of providing real-time speech analysis for a user. The method including capturing a speech input, performing a real-time recognition of the speech input and analyzing the recognized speech input to identify a possible error in the user's speech.

Yet another exemplary aspect of the present invention includes a system for providing real-time speech analysis. The system including a capture component for capturing a speech input, an Automatic Speech Recognition (ASR) component for performing real-time recognition of the speech input; and an analysis component for analyzing the recognized speech input to identify an error.

Still another exemplary aspect of the present invention includes a method for providing real time speech correction in a conversation context. The method including using an automatic speech recognition system (ASR) to convert speech of a plurality of speakers to text, the plurality of speakers including a user, processing the text to extract a contextual conversation cue, using the cue to detect at least one of a candidate sound, a candidate word and a candidate phrase, for correction, comparing a candidate list with information from a user profile, using a comparison result to suggest at least one of a correction and a synonym and informing the user through at least one of an audio feedback, a graphical feedback and a textual feedback of the at least one of the correction and the synonym.

According to exemplary aspects of the present invention, it is possible to provide real-time, passive monitoring of a user's speech, which does not require a user's active engagement. Such an approach is highly interactive, can utilize context and conversation semantics, and is highly personalized.

BRIEF DESCRIPTION OF THE DRAWINGS

The foregoing and other exemplary purposes, aspects and advantages will be better understood from the following detailed description. The detailed description describes various features and functions of the disclosed systems, methods and computer program products with reference to the accompanying figures. In the figures, similar systems typically identify similar components, unless context dictates otherwise. The illustrative system, method and computer program product are not meant to be limiting. It will be readily understood that certain aspects of the disclosed systems and methods can be arranged and combined in a wide variety of different configurations, all of which are contemplated herein.

FIG. 4 is a description of exemplary storage media which may be used in conjunction with the typical hardware configuration of FIG. 3 and also with the exemplary architecture of FIG. 1

DETAILED DESCRIPTION OF EXEMPLARY

Embodiments of the Invention

Figure 1:
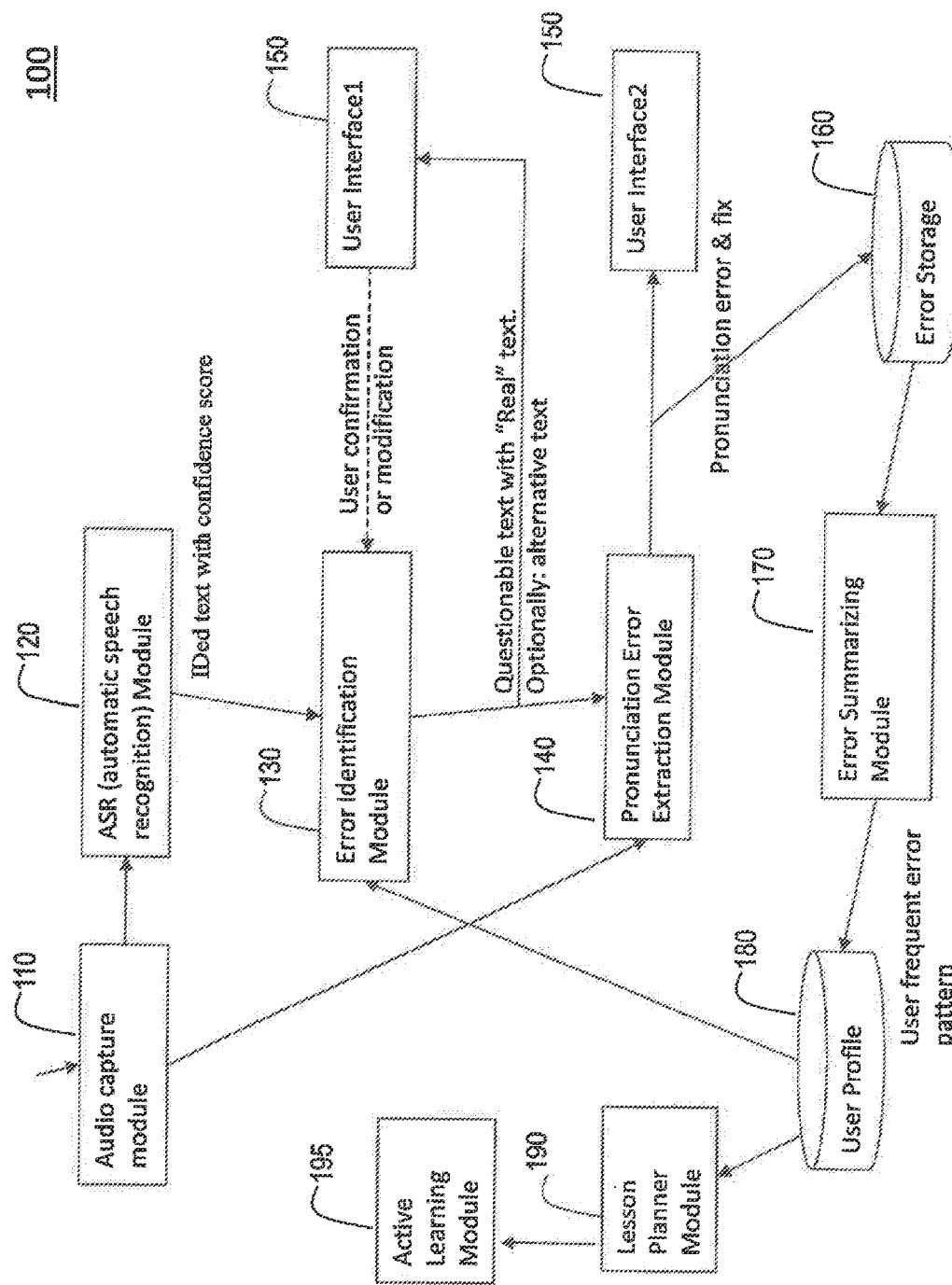
FIG. 1 is a description of an exemplary architecture of the present invention.

Referring now to the drawings, and more particularly to FIGS. 1-4, there are shown exemplary embodiments of the method and structures according to the present invention.

In today's busy world, one's time is at a premium. The present invention does not require active practicing. Rather, it provides real-time, passive monitoring of a user's speech.

Further, each person is unique. With respect to speech, one's weakness may be another's strength. Using pre-set words and phrases to correct and improve speech can only go so far. By analyzing actual speech from the user's daily life instead of selected text, the present invention covers a representative and complete set of the user's high frequency vocabulary.

The present invention also supports highly personalized pronunciation error profiles and speech recognition components. The customized, interactive lessons provided can target errors uniquely common to the user, and focus on problematic issues unique for the user.

The present invention deploys an interactive user interface, which can not only utilize user feedback to analyze speech errors, but can also suggest corrections to the user.

The present invention is able to leverage conversation context information to help identify errors. By using context information, conversation semantics, topic recognition and such, errors can be more easily identified. That is, the present invention may rely on context information within the speech of the user, and/or within an exchange between the user and one or more additional speakers. Such context information may be generally referred to as contextual conversation cues.

In an exemplary embodiment, the present invention monitors, in real-time, the user's speech in everyday life (e.g., conversation, phone call, meeting.)

The present invention may use speech recognition techniques to convert the speech to text, and identify questionable words/phrases by some metrics, which can include, but are not limited to one or several of: a confidence score in speech recognition, lexical context analysis (for example, using text mining techniques to identify words that seldom co-occur with the rest of context, and semantic context analysis (for example, recognize the other parties question and repetition/correction).

The present invention may correct questionable text without involving the user, and it may optionally highlight the questionable text in the user interface and ask the user to correct or confirm automated corrections (verbally or graphically).

The present invention may compare the standard pronunciation of the correct text with the user's pronunciation in original speech, identify errors, and store them in the user's profile.

The present invention may, in real-time, provide the user with the corrections both via audio, and via graphical interface with phonetics.

The present invention can summarize the user's frequent error patterns and display them to the user, and automatically arrange lessons aiming at correcting those errors. The present invention can maintain a histogram of the user's error patterns.

The present invention can be installed on portable devices such as smart phones, such as by downloading an application, or can be provided as a service through the internet or in various other ways programs and applications can be provided.

In an exemplary embodiment, the claimed invention can provide for pronunciation correction and training. Indeed, often times a pronunciation error is one of the major problems with a user's speech. Thus, the present invention may be particularly useful for providing for pronunciation correction and improvement.

In an exemplary embodiment, the methodology of the present disclosure may be accomplished by training an automatic speech recognition system (ASR) with native speakers. Then, the present invention continuously receives spoken language samples from a user into the ASR. The ASR output (e.g. text) is received with a confidence level associated with each word. The present invention then identifies, in the text, one or several words or phrases that are likely not what the user meant (this can also be referred to as "questionable" text).

The questionable text can be identified by picking words with a low confidence score. Further, the present invention can pick out words which appear out of context. The present invention can also use conversation semantics to identify questionable words.

A threshold on the confidence score to find questionable text may be set, for example, based on test results and can be adjusted and tuned. Adjustment and tuning of the threshold may help combat the threshold being set too high, and thus being too strict, leading to occasional reports of false alarms. Conversely, tuning and adjustment may help combat the threshold being set too low, and thus the threshold may lack needed sensitivity, leading to sometimes overlooking some errors.

The questionable words, phrases, etc may then be corrected using various techniques. Such techniques may include, for example, consulting the frequent error patterns in the user's profile, selecting the word(s) similar in pronunciation, but more preferable in context and statistical language model, asking the user to correct or confirm automated corrections via audio or graphical interface. Extracting errors made by the user may be accomplished in various ways. Such ways include, for example, comparing the phonetics of the correct text with the phonetics of the user's original pronunciation, and sending the real (correct) text through an automatic speech generation system (ASG) then comparing the speech output from the ASG with the user's original pronunciation.

The present invention can also provide optional, real-time feedback/correction to the user via audio or graphical interface. Such feedback and correction could include storing the errors into the user's profile, summarizing the user's errors into frequent patterns, and storing these patterns into the user's profile. Further, the present invention can create useful graphical data in the form of histograms of the user's pronunciation error patterns.

The present invention can be used as a stand-alone app on mobile devices, or as a service through the internet. The present invention can also be used as a tool for training of translation between languages, as a tool for young children learning to speak, or any other application in which a user has reason to monitor and correct speech and/or pronunciation.

As noted above, questionable text includes the text that the user did not really mean, but the ASR thought the user was saying due to his/her error (e.g. an incorrect pronunciation.) The "real" text includes what the user really meant. For example, let us assume that a user mispronounces cane sugar, by instead saying of kearn sugar. In this example, the questionable text would be "kearn sugar", and the "Real" text would be "cane sugar".

FIG. 1 illustrates an exemplary embodiment of the present disclosure. A system 100 is shown. The system includes a capture component 110, an Automatic Speech Recognition (ASR) component 120, an Error Identification component 130, an Error Extraction component 140, user interfaces 150, a storage component 160, an Error Summary component 170, a User Profile Component 180, a lesson planner component 190 and an active learning component 195.

The storage component 160 may represent, for example, a disk drive, a magnetic storage drive, an optical storage device, a flash memory storage device, other types of storage devices, and any of various combinations thereof.

The capture component 110 receives a speech input. The capture component 110 may receive the speech input from one or more sources. The speech input may include speech of a plurality of speakers. That is, in one exemplary embodiment, the speech input includes speech from a single user. In another exemplary embodiment, the speech input includes a conversation. The conversation may include a dialogue between a user and one or more additional speakers.

The input to the error identification component 130 includes text output from the ASR. The text output from the ASR may include conversation text. Speech text from the user is separated from other parties of the conversation. The speech may also have a confidence score associated with each word/phrase. Further, the error identification component 130 may also rely on information stored in the user profile component 180. Additionally, the error identification component 130 can respond to user feedback. The user feedback can be generated from the user interface 150. The dashed arrow from a user interface 150 represents the optional input from the user. User feedback can include, for example, a confirmation and/or modification of some questionable text with the actual (real) text, when prompted.

The user interfaces 150 can be separate or be in the same interface. The user interfaces 150 can be both audio and graphical/text.

Further, the present invention is capable of outputting a list with several possible texts, in addition to the most probable text output from the ASR. In that respect, the present invention can also use an N best list (the top N most possible text) of each sentence (see below in retrieving "Real" text).

Questionable text can be detected by the present invention in a variety of manners, none of which are exclusive or limited. In an exemplary embodiment, the error identification module can rely on question detection and question retrieval to detect questionable text. Thus, in this embodiment, the error identification module checks if other parties are questioning the user's previous statement, e.g., "did you mean . . . " "Pardon?", thereby determining errors by analyzing dialog between speakers.

Further, the error identification component 130 can perform and rely on a similarity computation. The similarity computation checks if other parties are trying to repeat or rephrase the user's previous statement. If others are trying to repeat or rephrase something the user has said, this often can be a strong indicator of an error.

Additionally, the error identification component 130 can perform and rely on a topic extraction. The topic extraction checks if the user's statement appears off-topic. If what the user is saying is off-topic, then it might be different from the real text. The error identification component 130 may also refer to the confidence score from the ASR, and/or refer to the user profile (i.e. what frequent errors the user makes)

The above described exemplary methods and technologies relied upon by the error identification component 130 may be performed and utilized either at the same time as one another, or separately. Other technologies and methods may also be used in a similar manner.

Real text can be retrieved by the present invention in a variety of manners as well. The real text may be retrieved by the error identification component 130 using hints from the other speakers. For example, a speaker's repetition or rephrasing of what the user has said. The real text may also be identified by finding a word or phrase which is similar to questionable text in pronunciation, but within the conversation topic. Further, the real text may be retrieved referring to the "N best" list for the speech of the questionable text. The real text may also be identified by referring to information in the user profile (e.g. what frequent errors the user makes).

The error identification component 130 can output various data and information. That is, the output of the error identification component 130 may include a text output. Such a text output may include questionable text which is marked, and may be shown together with several candidates of real text.

Optionally, the error identification component 130 may also output alternative text to avoid the user's frequent pronunciation errors. The alternative text may include a suggestion to the user of some text which is semantically similar to the real text, but without pronunciation difficulty to the user. For example, if a user has trouble pronouncing the word "automobile", the error identification component 130 may suggest that the user say "car" instead. One way of doing this would be by utilizing WordNet® or similar.

In an exemplary embodiment, the output of the error identification component 130 is fed to an input of the error extraction component 140.

Further, the output of the error identification component 130 may also be received by a user interface 150.

The error extract component 140 uses information received to extract an error. Indeed, in an exemplary embodiment, the error extraction component 140 receives an input which includes the questionable text together with the real text and/or original audio from which the questionable text was generated by the ASR The error extraction component 140 may then output, for example an error shown in text. This can be accomplished by comparing the questionable text with the real text, and finding the difference. The difference found in the comparison is the error extracted.

The error extraction component 140 may output a phonetic error. This is achieved when the error extraction module compares the phonetics of questionable text with the phonetics of "Real" text. The difference found in the comparison is the error extracted.

Furthermore, the error extraction component 140 may output an error shown in audio. This is achieved when the error extraction component sends the real text to an ASG (automatic speech generation module), which generates the correct pronunciation of the real text. Then, the correct pronunciation is compared with the original audio and the difference is the error in audio.

The output of the error extraction component is fed to a user interface 150. The output of the error extraction component may also be fed to the storage component 160.

The storage component 160 stores any errors which have been found. The output of the storage component 160 is fed to the error summary component 170. Thus, stored data from the storage component 160 is input to the error summary component 170.

The error summary component 170 may detect a pattern of user errors that can develop. Thus, the error summary component 170 can summarize the user's frequent error patterns. These error patterns can be displayed to the user. Further, these error patterns can be relied on to optionally arrange lessons for the user aimed at correcting those errors.

The data compiled in the error summary component 170 is output to and stored in the user profile component 180. The user profile may contain and store various information about the user. Such information may include, but is not limited to, the nationality of the user, any accents the user has, and history information about the user. Such history information may include the user's frequent error patterns, any speech from the user which has been analyzed, any previous responses to errors which have been identified, and any feedback from the user. The user might choose to ignore some error patterns he makes. Thus, in a certain period of time, if he makes that kind of error again, he may wish that the system to be tolerant of the error. This preference of tolerance can also be stored in the user profile and the configuration can be changed easily.

The creation and customization of lessons aimed at correcting and improving the user's speech can also provide many benefits to the user. Information from the user profile component 180 may be output to a lesson planner component 190. The lesson planner component 190 can arrange user lessons. Such lessons are highly interactive and highly customizable. The lessons may be created by relying on user input, user feedback, the user error patterns, or other user data. Equipped with such information, the lessons may further be customized by the user. All of the lessons can be useful to target specific types of errors, problem areas for the user, and other areas of difficulty. Such lessons can be arranged passively without requiring any of the user's time or effort for interaction.

The user may also desire to actively participate with some lessons. The user may do so with lessons from the active learning component 195. Such a component may not utilize a conversation, but may need the user's active participation. The lesson material may include, for example, reference sentences which may make figuring out errors easier. In an exemplary embodiment, the error summary component 170 may be trained by machine learning. For example, machine learning algorithms can automatically categorize errors and extract error patterns: given expected pronunciation and incorrect pronunciation, using context, phonetics and/or lexical information as features. Different machine learning techniques, such as decision tree, SVM, and many more, can be used to perform the categorization. Information in the user profile component 180 may be relied upon by the error identification component 130.

Exemplary methods according to exemplary embodiments of the present invention may also be performed based on FIG. 1

Figure 2:
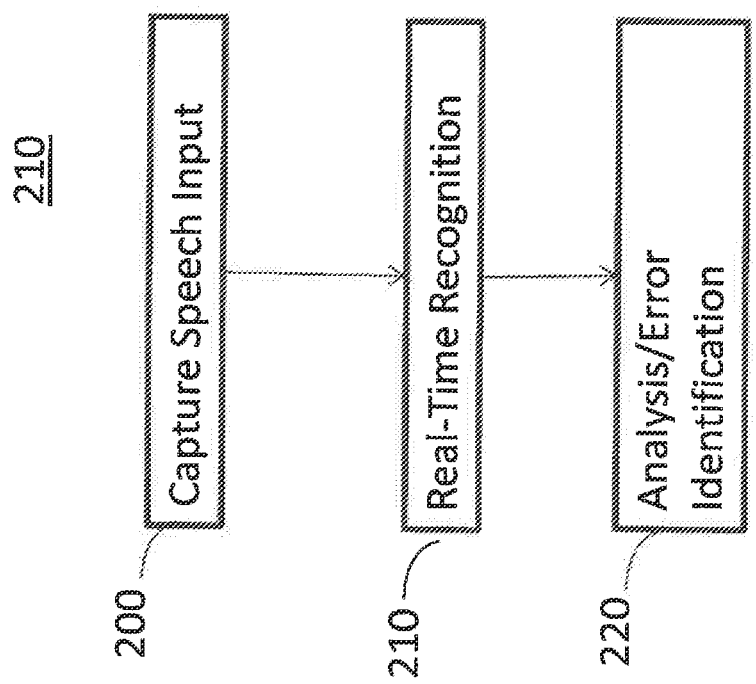
FIG. 2 is illustrates an exemplary method according to an exemplary embodiment of present invention.

FIG. 2 illustrates an exemplary method according to an exemplary embodiment of the present invention. In step 200, a speech input is captured. Then, in step 210, a real-time recognition is performed on the speech input. Then, in step 220, the recognized speech input is analyzed and an error may be identified.

An approach of an exemplary embodiment of the present disclosure may be presented by way of example. The following demonstrates an example of the use of conversation context (i.e contextual conversation cues).

In this example, the present invention is working in the background for a user, Sally, on her smart phone. Sally gave her husband a driving instruction, "You should go to the left learn when you see the department store, then take a left turn at the next light." Sally's husband responded in agreement but without conviction: "Uh-huh . . . " The present invention uses this contextual information, and interrupts Sally to remind her that "you probably mean lane and not learn" in a way that only she can hear. Sally then corrects herself to her husband: "make sure you stay in the left lane."

Later, Sally in another call asked her husband to buy some sugar, "Buy some pure kearn sugar." Her husband responded with: "Where do they keep the corn sugar? All I can find near flour is cane sugar." The present invention notices Sally probably meant sugarcane and suggests that as a synonym for cane. The present invention then prompts Sally "try sugarcane instead of cane" and notes her difficulty with cane. Sally then explains to her husband she wants sugarcane sugar and feels very proud of herself for being clearly understood.

Anytime Sally wants, she can check with the application to see the errors she made, and the most frequent error patterns, which, in her case today, would be "*ane" as "*earn".—This pattern will be stored in Sally's personal profile, and helps capture more of her errors later.—Lessons customized to correct this error pattern can be arranged for Sally.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. FIG. 4 shows some exemplary computer readable storage mediums. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or system. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
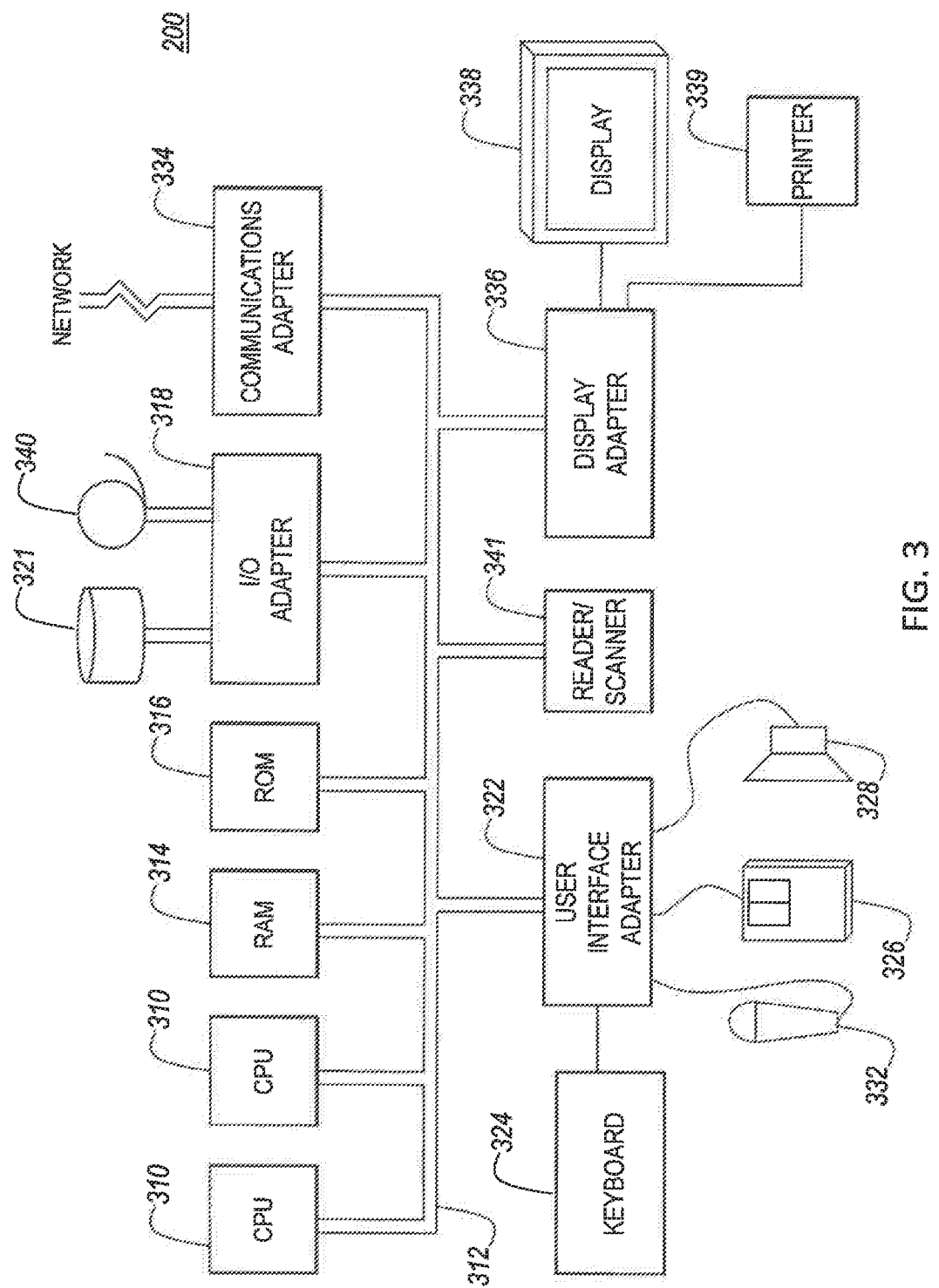
FIG. 3 is a typical hardware configuration which may be used for implementing the inventive aspects of the present disclosure.

FIG. 3 shows a typical hardware configuration 300, which may be used for implementing the aforementioned inventive aspects of the present disclosure. The configuration has preferably at least one processor or central processing unit (CPU) 310. The CPUs 310 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, an Intranet, a personal area network (PAN), etc., and a display adapter 336 for connecting the bus 312 to a display device 338 and/or printer 339. Further, an automated reader/scanner 341 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of storage media.

Thus, this aspect of the present invention is directed to a programmed product, including storage media tangibly embodying a program of machine-readable instructions executable by a digital data processor to perform the above method.

Such a method may be implemented, for example, by operating the CPU 310 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 310 and hardware above, to perform the method of the invention.

This non-transitory storage media may include, for example, a RAM contained within the CPU 310, as represented by the fast-access storage for example. Alternatively, the instructions may be contained in another storage media, such as a magnetic data storage diskette 400 or compact disc 402 (FIG. 4), directly or indirectly accessible by the CPU 310.

Whether contained in the computer system/CPU 310, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, C++, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method of providing real-time speech analysis to a user, the method comprising:
    capturing a speech input;
    performing a real-time recognition of the speech input including converting the speech input to a text;
    analyzing the recognized speech input to identify an error in a voice of the user, the analyzing including comparing a voice of a correct text generated by an automated speech generation system with the captured speech input; and
    processing the text to extract a context dialog prompt,
    wherein the comparing the voice of the correct text with the captured speech input includes comparing a standard pronunciation of the correct text with a pronunciation of the user in the captured speech input to identify the error in the speech.

2. The method of claim 1, further comprising:
    extracting a user generated error; and
    summarizing a common error pattern with a machine learning algorithm,
    wherein at least one of the error generated by the user and the common error pattern is stored in a user profile.

3. The method of claim 2, wherein the user profile comprises at least one of a user nationality, a user accent, and a user history, the user history including an analyzed user speech, a prior response to the identified error, a prior user feedback, and at least one of fault tolerance preferences of the user.

4. The method of claim 1, wherein the speech input comprises a speech from the user and at least one speaker other than the user.

5. The method of claim 1, wherein the error comprises at least one of a pronunciation error and a syntax error.

6. The method of claim 1, wherein the analyzing comprises a semantic analysis.

7. The method of claim 1, wherein the performing real-time recognition comprises using a voice prompt from at least one speaker other than the user.

8. The method of claim 1, wherein the context dialog prompt identifies the error.

9. The method of claim 1, further comprising providing the user with suggested error corrections in a real time.

10. The method of claim 1, further comprising creating a customized user learning session,
    wherein the learning session comprises an interactive learning session, and
    wherein the learning session is based on a common error mode.

11. The method of claim 1, further comprising outputting at least one of the identified error, visual corrections, audible corrections, and suggested synonyms to the user.

12. A system for providing a real-time speech analysis, the system comprising:
    a capture module for capturing a speech input;
    an automatic speech recognition module for performing real-time recognition of the speech input including converting the speech to a text;
    an analysis module for analyzing the recognized speech input to identify an error including comparing the speech of a correct text generated by an automated speech generation system with the captured speech input; and
    a processor to process the text to extract a context dialog prompt,
    wherein the comparing the voice of the correct text with the captured speech input includes comparing a standard pronunciation of the correct text with a pronunciation of the user in the captured speech input to identify the error in the speech.

13. The system of claim 12, wherein the analysis module generates a predicted speech meaning based on the speech input.

14. The system of claim 13, wherein the error is identified by comparing the predicted speech meaning to the speech input.

15. The system of claim 12, further comprising a lesson planner module for scheduling at least one of a predefined course and an automatically created course.

16. The system of claim 12, further comprising an error summary module for determining one or more error patterns.

17. The system of claim 12, further comprising a user profile module that stores at least one of an error summary and a user error mode.

18. The system of claim 12, wherein the capturing of the speech input comprises continuously monitoring a voice input.

19. The system of claim 12, further comprising an interactive user interface module that uses feedback information of the user to analyze the error and to suggest an error correction.

20. The system of claim 12, wherein the capturing of the speech input comprises continuously receiving a voice input.

* * * * *